US007556833B2

(12) United States Patent
Dias et al.

(10) Patent No.: US 7,556,833 B2
(45) Date of Patent: *Jul. 7, 2009

(54) CHEESE FLAVORING SYSTEMS PREPARED WITH BACTERIOCINS

(75) Inventors: Benjamin E. Dias, Chicago, IL (US); Chad David Galer, Glenview, IL (US); James William Moran, Antioch, IL (US); Rathna Koka, Mount Prospect, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 306 days.

This patent is subject to a terminal disclaimer.

(21) Appl. No.: 10/723,257

(22) Filed: Nov. 26, 2003

(65) Prior Publication Data

US 2005/0112238 A1 May 26, 2005

(51) Int. Cl.
*A23C 9/12* (2006.01)
(52) U.S. Cl. .............................. 426/34; 426/35; 426/36; 426/534; 426/535; 426/580; 426/582; 426/650
(58) Field of Classification Search .................. 426/34, 426/35, 36, 37, 38, 39, 40, 534, 535, 580, 426/582, 650
See application file for complete search history.

(56) References Cited

U.S. PATENT DOCUMENTS

| | | | |
|---|---|---|---|
| 3,100,153 | A | 8/1963 | Knight |
| 3,975,544 | A | 8/1976 | Kosikowski |
| 4,119,732 | A | 10/1978 | Kratochvil |
| 4,172,900 | A | 10/1979 | Dooley |
| 4,244,971 | A | 1/1981 | Wargel et al. |
| 4,500,549 | A | 2/1985 | Crossman |
| 4,584,199 | A | 4/1986 | Taylor |
| 4,708,876 | A | 11/1987 | Yokoyama et al. |
| 4,716,045 | A | 12/1987 | Prella |
| 4,752,483 | A | 6/1988 | Hagberg et al. |
| 5,211,972 | A | 5/1993 | Kratky et al. |
| 5,262,183 | A | 11/1993 | Moran et al. |
| 5,271,949 | A | 12/1993 | Haring et al. |
| 5,356,640 | A | 10/1994 | Jameson et al. |
| 5,455,051 | A | 10/1995 | Groesbeck et al. |
| 5,527,505 | A | 6/1996 | Yamauchi et al. |
| 5,549,916 | A | 8/1996 | Gamay |
| 5,635,228 | A | 6/1997 | Sponholtz |
| 5,715,811 | A | 2/1998 | Ohki et al. |
| 5,753,614 | A | 5/1998 | Blackburn et al. |
| 5,895,671 | A | 4/1999 | Adamany et al. |
| 5,952,022 | A | 9/1999 | Veal |
| 6,022,567 | A | 2/2000 | Lecouteux et al. |
| 6,054,151 | A | 4/2000 | Kwon et al. |
| 6,110,509 | A | 8/2000 | Nauth et al. |
| 6,214,585 | B1 | 4/2001 | Kwon et al. |
| 6,406,724 | B1 | 6/2002 | Reddy et al. |
| 6,562,383 | B1 | 5/2003 | Moran et al. |

2001/0024667 A1 9/2001 Smith et al.

FOREIGN PATENT DOCUMENTS

| | | | |
|---|---|---|---|
| GB | 713251 | * | 8/1954 |
| WO | 01/47366 A1 | | 5/2001 |
| WO | WO 01/47366 | | 7/2001 |

OTHER PUBLICATIONS

Tamime, A. et al., "The Quality of Processed Cheese Made From Reconstituted Skim Milk Powder Cheese Base," Egyptian J. Dairy Sci., 18:115-131 (1990).
Sood, V.K. and Kosikowski, F.V., "Process Cheddar Cheese from Plain and Enzyme Treated Retentates," 1979, J. Dairy Sci. 61:1713-1718.
Aly, M.E., Abdel-Baky, A.A., Farahat, S.M., "Quality of Processed Cheese Spread Made Using Ultrafiltered Retentates Treated with some Ripening Agents," 1995, Int. Dairy Journal 5, pp. 191-209.
Weimer, B. et al., "Influence of NaCl and pH on intracellular enzymes that influence Cheddar cheese ripening*," 1977, Lait, pp. 383-398.
Rattray, Fergal P., and Fox, Patrick F., "Aspects of Enzymology and Biochemical Properties of *Brevibacterium linens* Relevant to Cheese Ripening: A Review[1]," 1999, J. Dairy Sci. pp. 82:891-909.
Urbach, G., Contribution of Lactic Acid Bacteria to Flavour Compound Formation in Dairy Products, Int. Dairy Journal 5 (1995) 877-903.
V.K. Sood et al., "Process Cheddar Cheese From Plain And Enzyme Treated Retenates," J. Diary Sci., 1979, vol. 62, pp. 1713-1718.
A. Tamime et al., "The Quality Of Processed Cheese Made From Reconstituted Skim Milk Powder Cheese Base," Egyptian J. Dairy Sci., 1990, vol. 18, pp. 115-130.
M.E. Aly et al., "Quality Of Processed Cheese Spread Made Using Ultrafiltered Retenates Treated With Some Ripening Agents," Int. Dairy Journal, 1990, vol. 5, pp. 191-209.
G. Urbach, "Contribution Of Lactic Acid Bacteria To Flavour Compound Formation In Dairy Products," Int. Dairy Journal, 1995, vol. 5, pp. 877-903.
B. Weimer et al., "Influence of NaC1 and pH on intracellular enzymes that influence cheddar cheese ripening," Lait, 1997, vol. 77, pp. 383-398.
Fergal P. Rattray et al., "Aspects Of Enzymology And Biochemical Properties Of *Brevibracterium linens* Relevant To Cheese Ripening: A Review," J. Dairy Sci., 1999, vol. 82, pp. 891-909.

* cited by examiner

*Primary Examiner*—Leslie Wong
(74) *Attorney, Agent, or Firm*—Fitch, Even, Tabin & Flannery

(57) ABSTRACT

A stabilized cheese flavoring system which can be used to prepare very different cheeses having desired flavor profiles in which the flavoring system is stabilized against the growth of spoilage or pathogenic microorganisms therein, while flavor development can be accelerated in one more of its flavor components thereof. The stabilized flavoring systems are obtained by addition of a bacteriocin source as part of fermentation process that accelerates the fermentation time needed for flavor development in one or more of its flavor components, and in at least a sulfur-cheddary component thereof in one embodiment. Therefore, production times can be significantly reduced for one or more of the flavor components of the flavoring system of the present invention without loss of flavor and while improving its microbial stability.

45 Claims, 2 Drawing Sheets

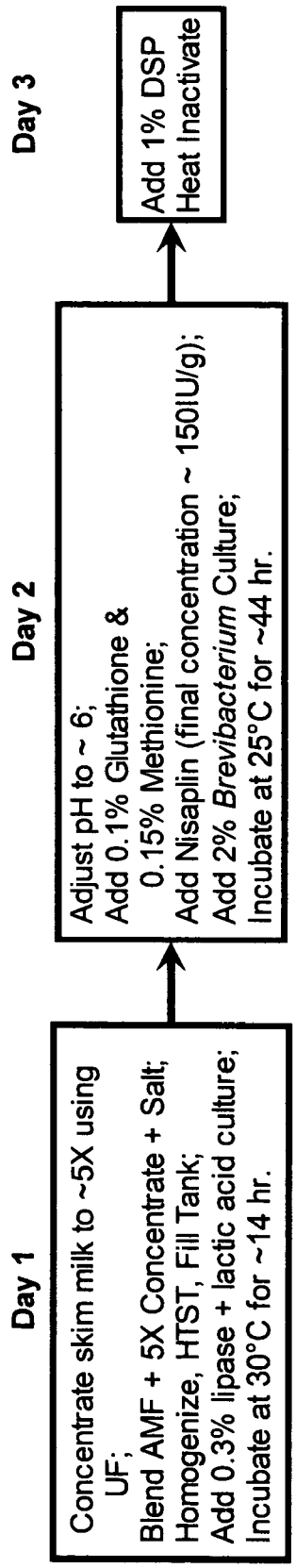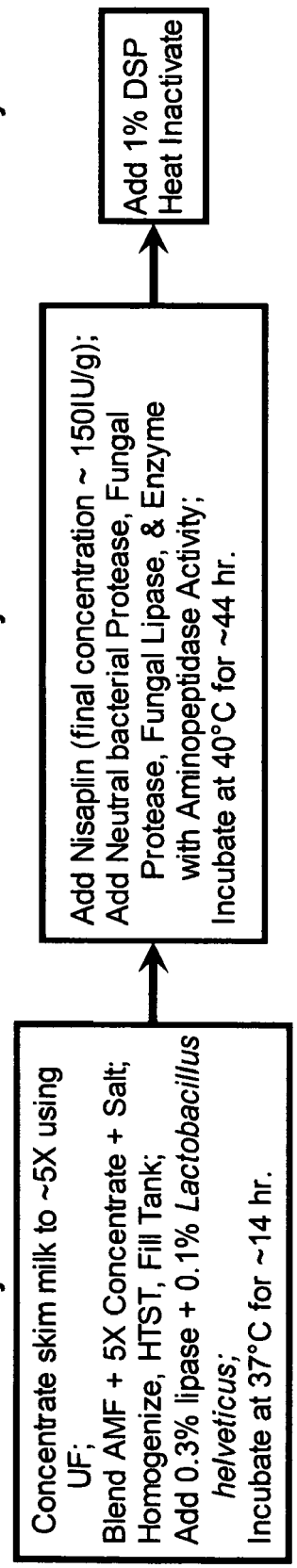
Figure 2
Figure 3

CHEESE FLAVORING SYSTEMS PREPARED WITH BACTERIOCINS

FIELD OF THE INVENTION

The present invention relates generally to a stabilized cheese flavoring system, and flavor components thereof, which can be used to prepare very different cheeses having desired flavor profiles. More specifically, the present invention relates to a flavoring system which is stabilized against the growth of spoilage or pathogenic microorganisms therein, while accelerated development of flavor in one or more of its flavor components is achieved. The stabilized flavoring systems are obtained by addition of a bacteriocin source as part of the fermentation process that accelerates at least part of the fermentation time needed for flavor development in one or more of its flavor components, and in at least a sulfur-cheddary component thereof in one embodiment. Therefore, production times can be significantly reduced for one or more of the flavor components of the flavoring system of the present invention without loss of flavor and while improving its microbial stability. Methods of making and using these flavoring systems in food products, such as cheese products, also are provided.

BACKGROUND OF THE INVENTION

Traditionally natural cheese is made by developing acidity in milk and setting the milk with a clotting agent, such as rennet, or by developing acidity to the isoelectric point of the casein. The set milk is cut and whey is separated from the curd. The curd may be pressed to provide a cheese block. Curing typically takes place over a lengthy period of time under controlled conditions. Cheddar cheese, for example, is often cured for a number of months, and may be cured for a period in excess of one year, to obtain the full flavor desired.

Numerous reports have been published implicating several compounds to be important in the development of cheese flavor in cheese products. The main classes of compounds thought to contribute to flavor generation in cheese include amino acids, peptides, carbonyl compounds, fatty acids and sulfur compounds. Urbach, G., Contribution of Lactic Acid Bacteria to Flavor Compound Formation in Dairy Products, Int'l Dairy J., 1995, 3:389-422. Several volatile compounds including fatty acids, esters, aldehydes, alcohols, ketones and sulfur compounds are included in lists describing the aroma of various cheeses. Production of several of these aroma and flavor compounds has been attributed to multiple enzymatic and chemical reactions that take place in a sequential manner in ripening cheese.

Various microorganisms have been identified and selected for their ability to produce particular flavors in a cheese ripening environment. These flavors arise through a series of enzymatic steps. For example, in cheese, degradation of proteins by proteases and peptidases can lead to the production of peptides and free amino acids. These precursors are shuttled through subsequent enzymatic and chemical reactions resulting in the formation of flavor compounds. An understanding of these reactions helps in the creation of flavors of a desired cheese type. Fox, P., Cheese: Chemistry, Physics and Microbiology, pp. 389-483, 1993.

Cheese manufacturers are interested in developing cheese products requiring less storage time before they are favorable enough for commercial distribution. Cheese makers have used a wide variety of different techniques in efforts to accelerate the cheese curing or ripening process. Published U.S. patent application Ser. No. US 2001/0024667 A1 provides a summary of a number of these techniques used for accelerating ripening of hard block cheeses, and reference is made thereto.

Another approach used to avoid lengthy cheese ripening periods has been to make a cultured cheese concentrate ("CCC") having more intense cheese flavor, and then use the CCC in various products to provide cheese flavoring. CCC's which attain full cheese flavor development within a number of days instead of months can be prepared. These CCC's are added to other bulk foods, such as process cheeses or snack foods, to impart or intensify a cheese flavor in them. Methods for the manufacture of such cheese-flavored concentrates have been described, such as in U.S. Pat. No. 4,708,876. Typically the process involves a dairy substrate that is cultured with a lactic culture followed by addition of various proteases, peptidases and lipases. The '876 patent describes cheese flavored concentrates that can be obtained from milk as a starting material, instead of cheese curds, and/or without formation of whey by-product.

However, even if these prior processes may produce an accelerated development, or an enhancement, of cheese flavor, they do not produce enhancements that target specific cheese flavor components. More recently a technology has been developed to produce a natural biogenerated cheese flavoring system that can be used to prepare different cheese products/derivatives, targeted at various cheese flavor profiles using a modular approach to flavor creation, which is described in U.S. Pat. No. 6,406,724. The cheese flavoring system described in the '724 patent is made up of different components, in which the individual components are combined in different ratios to provide specific flavor profiles in the cultured cheese concentrate products.

In addition, the effects of bacteriocin producers, when used as adjunct cultures to thermophilic starters of high aminopeptidase activity, on ripening speed in semihard and hard cheeses has been observed and described in the literature. Oumer, A., et al., "The Effects of Cultivating Lactic Starter Cultures with Bacteriocin-Producing Lactic Acid Bacteria," J. Food Protection, vol. 64, no. 1, pp. 81-86. The use of a bacteriocin-producing E. faecalis culture in a cheese starter system for making a semi-hard cheese at low pH's (below 5.5) for enhancement of cheese flavor after a relatively long ripening period (viz., 21 to 35 days), has been described by Oumer, A., et al., "Defined Starter System Including a Bacteriocin Producer for the Enhancement of Cheese Flavor," Biotechn. Techniques, 13: 267-270, 1999. The use of live cultures having high levels of proteolytic enzymes and peptidolytic enzymes to debitter enzyme modified cheeses (EMC's) also has been described, such as in U.S. Pat. No. 6,214,585.

However, in addition to accelerating ripening or flavor development in cheeses, another important consideration in modern cheese making is the inhibition of the growth of spoilage and pathogenic microorganisms in the cheese products. For instance, processed block cheese and processed cheese spreads can be vulnerable to spoilage by germination and growth of bacterial spores that originate in the raw cheese and survive the cooking (melt) process used in their manufacture.

Bacteriocins are generally known as being effective in inhibiting pathogenic and spoilage microorganisms in foods, such as described by Twomey, D. et al., Lantabiotics Produced by Lactic Acid Bacteria: Structure, Function and Applications, Antonie van Leeuwenhoek, 82:15-185, 2002, and Cleveland, J., et al., "Bacteriocins: Safe, Natural Antimicrobials for Food Preservation," Int'l J. Food Micro., 71 (2001) 1-20. Antimicrobials, such as nisin, lacticin, plantaricin C, and so forth, are generally understood to act on sensitive cells by forming pores in the cytoplasmic membrane. This leads to the dissipation of the proton motive force and release of small intracellular molecules like glutamate and ATP, such as described by Twomey et al. and Cleveland et al., referenced above. This renders the cells permeable but still capable of participating in biochemical processes in its environment. The treatment of cells with surface-active agents to help generate such "leaky" cells, has been described in PCT Int'l Publication No. WO 01/47366 A1.

Nisin, in particular, is a peptide-like antibacterial substance produced by certain strains of the dairy starter organism *Lactococcus lactis* subsp. *lactis* (formerly known as *Streptococcus lactis*). Nisin is a small polypeptide of 34 amino acids, which include the atypical residues lanthionine, β-methyllanthionine, dehydroalanine, and dehydrobutyrine. The first-two mentioned residues close the single sulfur rings that are characteristic of nisin and other structurally related bacteriocins. Variants of nisin are known, including, for example, Nisin A and Nisin Z. Nisin's structure is illustrated, for example, in U.S. Pat. No. 5,527,505 to Yamauchi et al. The highest activity preparations of nisin contain about 40 million IU per gram. A commercial preparation, NISAPLIN®, containing about 1 million IU active nisin per gram is available from Aplin & Barrett Ltd., Trowbridge, England. Nisin has no known toxic effects in humans. It is widely used in a variety of prepared dairy foods. Experimental use in preserving other foods has also been reported. The cultures that produce nisin, being lactic fermentations, generally produce lactate as well.

The possibility that nisin may inhibit Gram positive and Gram negative bacteria when used in conjunction with a chelating agent has been described in U.S. Pat. No. 5,753,614. With respect to cheese products in particular, nisin has been used to inhibit growth and toxin formation of spore-forming spoilage organisms in process cheeses, such as described in U.K. Patent 713,251, and in process cheese spreads, such as described in U.S. Pat. No. 4,584,199. The use of a nisin-producing culture to stabilize a cream cheese composition against the growth of microbiological contaminants therein also has been described in U.S. Pat. No. 6,110,509. In the '509 patent, the cream cheese is made using a fermentation step conducted until a composition inoculated with a nisin-producing microorganism attains a pH in the range of 6.2 to 4, more particularly about 5.5, at which point curds and nisin-containing whey are separated.

Despite the developments described in the above publications, a need still exists for cheese flavoring systems that can develop their flavor and ripen more rapidly, such as within several days, without the formation of byproducts like whey, and inhibiting the growth of objectionable or pathogenic microorganisms in the resulting product. The present invention provides a stabilized cultured cheese concentrate and method for its manufacture that meets these and other desirable needs as well as provides other benefits.

SUMMARY OF THE INVENTION

The present invention relates generally to a stabilized cheese flavoring system which can be used to prepare very different cheeses having desired flavor profiles in which the flavoring system is stabilized against the growth of spoilage or pathogenic microorganisms therein, while flavor development can be accelerated in one or more of its flavor components thereof. The stabilized flavoring systems are obtained by addition of a bacteriocin source as part of fermentation process that accelerates the fermentation time needed for flavor development in one or more of its flavor components, and in at least a sulfur-cheddary component thereof in one embodiment. Therefore, production times can be significantly reduced for one or more of the flavor components of the flavoring system of the present invention without loss of flavor and while improving its microbial stability.

In one embodiment, the present invention relates to a stabilized cheese flavoring system comprising a "sulfury-cheddar" component, a "cheesy" component, and a "creamy-buttery" component, that can be produced having greater stability against the growth of adverse spoilage and pathogenic organisms while flavor development is accelerated in at least the "sulfury-cheddar" component of the flavoring system. These improvements are made possible due to the effects of a bacteriocin source added during at least part of the fermentation procedure used to make the flavoring system. Each of the "sulfury-cheddar," "cheesy," or "creamy-buttery" flavored components can be used as flavor building block with their own specific flavor profiles and/or characteristics. Using various combinations of these flavored components (i.e., the cultured cheese concentrate of this invention), cheeses having a wide variety of flavors can be produced. The flavored components of the present flavoring system are separately prepared from a dairy product containing a protein and fat combination using a bacteroicin source, enzymes (which may be, for example, in the form of whole cells, cell extracts, partially purified enzymes, purified enzymes, and the like), cultures, additives, and process conditions designed to provide flavor components having specific flavor profiles and/or characteristics.

In one embodiment, the present invention provides a flavoring system comprising a sulfury-cheddar flavor component, a cheesy flavor component and a creamy-buttery flavor component, wherein the sulfury-cheddar flavor component is prepared by treating a first dairy product containing an aqueous protein source and fat source combination with lipase and a lactic acid culture at a temperature of about 15 to about 35° C. for about 10 to about 72 hours to obtain a first mixture having a pH of about 5.8 or less; adjusting the pH of the first mixture to about 6.0 or higher to obtain a second mixture; treating the second mixture with a sulfur-containing substrate, and a microorganism that can convert the sulfur-containing substrate to sulfur-containing flavor compounds (e.g., a *Brevibacterium* culture or a yeast from the genera *Debaromyces* or *Kluyeromyces*), and optionally a first bacteriocin source, at a temperature of about 15 to about 35° C. for about 12 to about 96 hours to obtain a third mixture; heating the third mixture at a temperature sufficient to inactivate the cultures and enzymes in the third mixture to form the sulfury-cheddar flavor component;

wherein the cheesy flavor component is prepared by treating a second dairy product containing an aqueous protein source and fat source combination with a lactic acid culture at a temperature of about 15 to about 45° C. for about 10 to about 72 hours to obtain a fourth mixture; treating the fourth mixture with a lipase, a protease, and an aminopeptidase, and optionally a second bacteriocin source, at a temperature of about 20 to about 50° C. for about 16 to about 96 hours to obtain a fifth mixture; treating the fifth mixture at a temperature sufficient to inactivate the cultures and enzymes in the fifth mixture to form the cheesy flavor component;

wherein the creamy-buttery flavor component is prepared by treating a third dairy product containing an aqueous protein source and fat source combination with a lactic acid culture at a temperature of about 20 to about 35° C. for about 10 to about 24 hours to obtain a sixth mixture having a pH of about 5.4 or less; treating the sixth mixture with a diacetyl-producing flavor culture, and optionally a third bacteriocin source, at a temperature of about 20 to about 35° C. for about 16 to about 240 hours to obtain a seventh mixture; heating the seventh mixture at a temperature sufficient to inactivate the cultures and enzymes in the seventh mixture to form the creamy-buttery flavor component;

wherein at least one of the first, second, and third bacteriocin sources is included, and wherein the sulfury-cheddar flavor component, the cheesy flavor component and the creamy-butter flavor component of the flavoring system can be incorporated in varying amounts into food products, including cheese products, to produce a variety of flavors.

After the above-indicated heat inactivation steps are completed, the three flavored components can be used separately, or can be combined in groups of two or three thereof, to provide desired highly flavored cultured cheese concentrates. The cultured cheese concentrates can be incorporated into food products to impart or intensify cheese flavors in the products. For instance, the cheese flavoring system of the present invention can be added as a cultured cheese concentrate to or upon various foods such as cheeses, dairy bases, snacks, pastas, vegetables, doughs, breads, masa, and so forth, to impart a cheese flavor thereto. The cheese or dairy base can be selected, for example, from process cheese, natural cheese, cream cheese, or cottage cheese.

The flavoring system of the present invention also can be used as a cultured cheese concentrate incorporated into a milk substrate or whey substrate from which cheese is produced. For instance, the cultured cheese concentrates can be added to a milk substrate used to produce cheese, wherein the milk substrate is then treated to produce the desired cheese. Alternatively, the flavor concentrates can be added to a cheese or dairy base (i.e., a cheese curd and/or dairy solids lacking the desired flavor profile) to produce the desired cheese. The flavoring system of the present invention can also be used in the methods described in U.S. Pat. No. 6,562,383, which is hereby incorporated herein by reference in its entirety, to provide a flavored cheese that does not require curing or aging.

The sulfury-cheddar flavor component of the flavoring system, which has strong sulfur notes, also can be used alone as a cultured cheese concentrate to provide sharp cheddar flavor notes. For instance, the sulfury-cheddar flavor component can also be used alone to replace aged flavored cheese in the manufacture of process cheese. Thus, the present invention also provides a process for producing a sharp cheddar flavor component or concentrate for use in cheese manufacture. This sharp cheddar flavor component or concentrate can be used alone to add specific flavor notes to natural cheese, especially to provide sharp cheddar notes to very young cheddar cheeses. Thus, this present invention also provides a sulfury-cheddar flavor component for use in cheese flavoring, wherein the sulfury-cheddar flavor component is prepared as described herein in connection with the flavoring system.

For purposes of the present invention, bacteriocins or bacteriocin sources generally include antimicrobial agents suitable for use in food products. Especially preferred antimicrobial agents include "lantibiotics" (i.e., polypeptides containing lanthionine and β-methyl lanthionine). Non-limiting examples of such lantibiotics are nisin, such as nisin A or nisin Z, or nisin analogs or related lanthionine-containing peptides, such as pediocin, lactosin, lactacins (e.g., lacticin A, lacticin B, lactacin F), camocin, enterocin, plantaricin, subtilin, epidermin, cinnamycin, duramycin, ancovenin, Pep 5, and the like, individually or in any combination thereof. Other bacteriocins that are useful in the present invention include, for example, lactococcins (e.g., lactococcin A, lactococcin B, lactococcin M), leucocoin, helvetican, acidophilucin, caseicin, and the like, individually or in any combination.

BRIEF DESCRIPTION OF THE DRAWINGS

Other features and advantages of the present invention will become apparent from the following detail description of preferred embodiments of the invention with reference to the drawings, in which:

FIG. 2 illustrates the preparation of a sulfury-containing component of a cultured cheese concentrate according to an embodiment of the present invention.

FIG. 3 illustrates the preparation of a cheesy component of a cultured cheese concentrate according to an embodiment of the present invention.

DETAILED DESCRIPTION OF THE INVENTION

Figure 1:
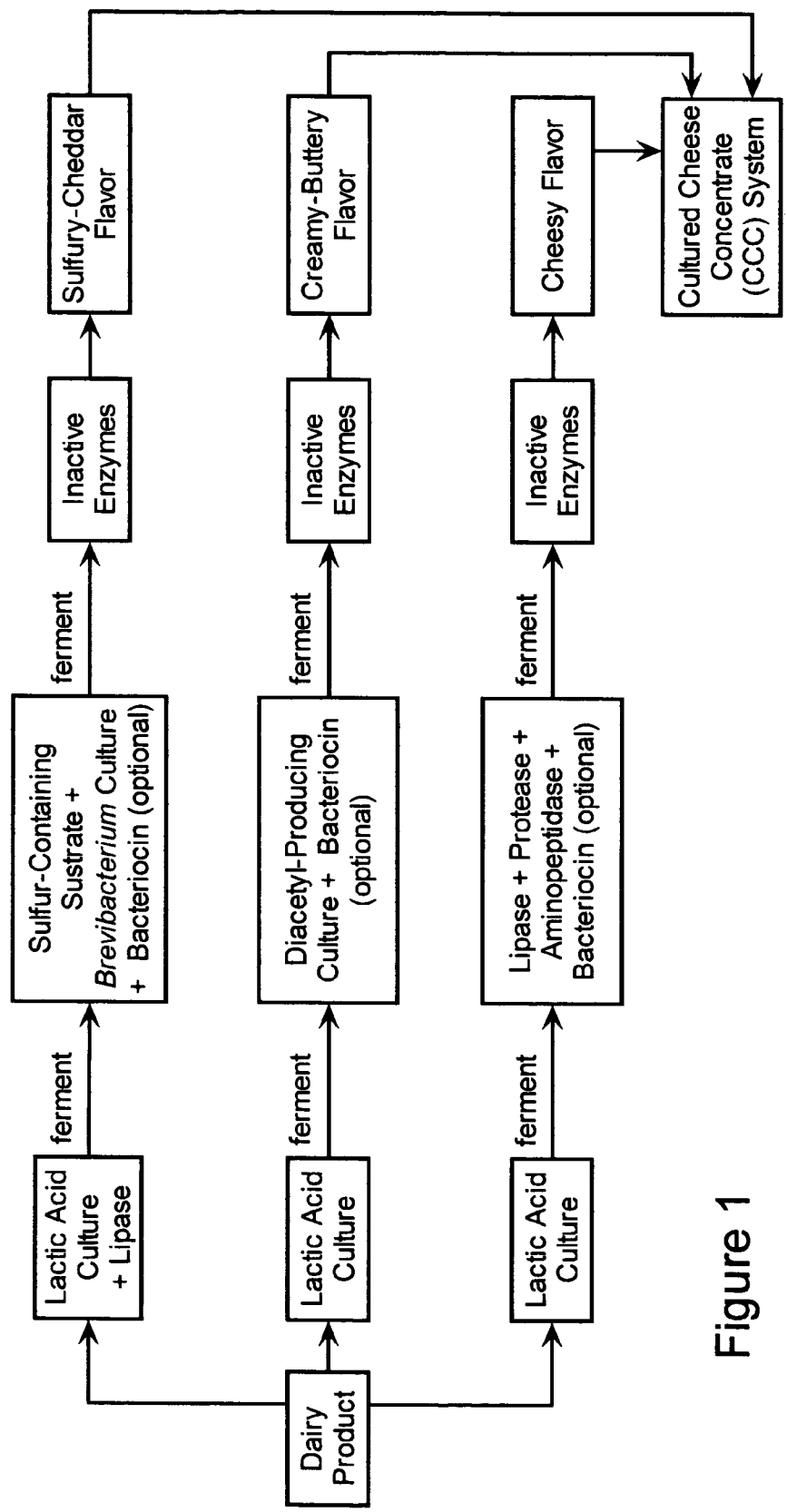
FIG. 1 illustrates the preparation of a cultured cheese concentrate of an embodiment of the present invention containing one or more of a sulfury-containing component, a cheesy flavor component, and a creamy-butter component.

The present invention relates to a stabilized cheese flavoring system, and flavor components thereof, which can be used to prepare very different cheeses having desired flavor profiles. The flavoring system and flavor components thereof are stabilized against the growth of spoilage or pathogenic microorganisms therein, while accelerated development of flavor in one or more of its flavor components is achieved. Antimicrobial agents are introduced during the fermentation periods of one or more the flavor components of the flavoring system, in which those agents have cell-permeabilizing capability to accelerate and aid generation of flavor and aroma compounds, especially under higher pH reaction conditions, for the production of cheese flavor concentrates. The use of the antimicrobial cell-permeabilizing agents in this manner has the concurrent advantage of inhibiting the growth of undesirable food spoilage and pathogenic bacteria both during and after production of the flavoring system. Antimicrobial agents are interchangeably referred to herein as bacteriocins.

The term bacteriocin encompasses either bacteriostatic and/or bactericidal activity against vegetative cells, and/or sporocidal and/or sporostatic activity against bacterial spores. Bacteriocins and lactobiotics, such as nisin, are thought to increase the permeability of the cytoplasmic membrane or cell wall of components present or developed in a dairy matrix during fermentation, permitting a substrate to diffuse across the cell membrane and be degraded to generate flavor compounds. Since the enzymes within the cell are still active, and in a relatively favorable environment, they would be capable of degrading various substrate molecules to generate flavor compounds. The optimum conditions for many of the enzymatic reactions involved in the generation of various cheese flavor compounds are approximately at or above a pH of about 6. The closer the pH of the dairy fermentation matrix to neutral, the more favorable these conversions generally will be. However, pH's above about 5.8 in cheese flavor components or precursors thereof generally also are more conducive to the growth of various food spoilage and pathogenic microorganisms. In the present invention, the use of lantibiotic cell permeabilizing agents, like nisin, in a dairy product matrix fermented at a relatively high pH of about 6 to about 7 helps in controlling the outgrowth of these microorganisms during that fermentation stage to within safe levels under pH conditions where desirable flavors can develop more rapidly.

In the present invention, the dairy fermentation matrix is fermented during at least one fermentation stage with a bacteriocin source present at a pH or pH's ranging generally from about 5 to about 7, and preferably between about 5.4 to about 7, and more preferably between about 6 to about 7. The lantibiotic nisin, for example, is sufficiently soluble to provide active levels thereof in the reaction mixtures encountered in methods practiced according to the present invention throughout the pH range of about 5 to about 7.

In the present invention, a secondary antimicrobial agent can also be used in combination with the bacteriocin source in preparing one or more of the flavor components. Such secondary antimicrobial agents should not adversely affect the preparation of the flavor components. Examples of such secondary antimicrobial agents include, for example, metal chelating agents (e.g., EDTA, citric acid, and the like), proton ionophores (e.g., sorbic acid, benzoic acid, parabens, and the like), lacto-antimicrobials (e.g., lactoferrin, lactolipids, and the like), ovo-antimicrobials (e.g., lysozyme, ovotransferrin, and the like), monoglycerides (e.g., monolinolenin, monolaurin, and the like), hops acids, and the like. When used, these secondary antimicrobial agents are generally present at levels of about 0.01 to about 0.5 percent. Especially preferred combinations include (1) nisin and EDTA, (2) nisin and mololinolenin, and (3) nisin and hop acids.

In one embodiment, the present invention is an improvement for improving upon the quality in cultured cheese concentrates (CCC), such as those made according to U.S. Pat. No. 6,406,724, which is hereby incorporated herein by reference in its entirety, while also making it possible to produce these concentrates or at least a flavor component thereof more rapidly to provide production related advantages. The present invention can be used in the generation of various flavors in various respective flavor components using cells that have been grown during fermentation under conditions including the presence of a bacteriocin source that promote flavor development within a shorter time cycle as compared to systems lacking the bacteriocin source. These cells whose membranes have been perforated by the presence of the added bacteriocins can degrade various flavor precursors via enzymatic reactions. In the present invention, at least one of the sulfur-cheddar, cheesy, and cream-buttery flavor components is prepared with a bacteriocin source present during a fermentation stage used in its preparation.

For instance, sulfury-cheddar components of cultured cheese concentrates produced using a bacteriocin source according to an embodiment of this invention can be produced with sufficient flavor development achieved for commercial purposes in less than about five days, particularly in less than three days, and the ripening (fermentation) period may be shortened to as little as about 26 hours. By contrast, sulfury-cheddar components of cultured cheese concentrates made according U.S. Pat. No. 6,406,724 generally require at least about 8 days (about 192 hours) to ripen to the same level of flavor development as obtained by the compositions and techniques of the present invention. Consequently, the present invention can save in excess of 3 days in production time over the methods described in U.S. Pat. No. 6,406,724 in the production of sulfury-cheddar components in particular. As can be appreciated, significant increases in productivity are made feasible by the present invention.

Cheesy components of cheese flavor concentrates with sufficiently developed flavor for commercial purposes can be prepared using a bacteriocin source as part of the process in less than about five days according to another embodiment of the present invention, more particularly in less than about 114 hours, and the ripening period may be shortened to as little as about 26 hours. By contrast, cheesy components of cultured cheese concentrates made according U.S. Pat. No. 6,406,724 generally require at least about 2 days (at least about 48 hours) to ripen to the same level of flavor development as obtained by the compositions and techniques of the present invention. Consequently, in some implementations, the present invention may also reduce production time over the methods described in U.S. Pat. No. 6,406,724 in the production of cheesy components of the flavoring system.

In one non-limiting embodiment thereof, an advantageous application of the present invention is in the preparation of enzyme modified cheese (EMC). Using cells with high aminopeptidase activity in combination with an antimicrobial that can permeabilize the cells can decrease the levels of aminopeptidases that need to be added to the matrix, thereby increasing efficiency. Since whole cells are being used, and not only enzyme preparations, EMC's produced via this method have a more rounded flavor.

Referring now to FIG. 1, in the present methods, the starting material for the fermentation method is a dairy product comprising a combination or mixture of an aqueous protein source and a fat source. The dairy product can be a milk concentrate, a milk substrate, a whey concentrate, a whey substrate, cheese curd, and the like, or combinations of these dairy substances with each other or in combination with a supplemental protein or fat source. The dairy product generally will be in the form of an aqueous protein and fat source combination. It also can be in emulsion form. The same or different dairy product compositions can be used as the starting material used in preparing the various flavor components of the present cheese flavoring system.

The dairy products useful as the starting material generally have total solids contents of about 10 to about 50 percent, protein contents of about 10 to about 19 percent, fat contents of about 5 to about 30 percent, and lactose contents of about 0.1 to about 10 percent. Preferably, they have total solids contents of about 25 to about 47 percent, protein contents of about 12 to about 17 percent, fat contents of about 18 to about 25 percent, and lactose contents of about 0.5 to about 5 percent. The moisture levels of the dairy product are generally from about 50 to about 90 percent, preferably from about 53 to about 75 percent.

The protein source can be a dried protein or concentrated material and is preferably a dairy ingredient, such as milk protein concentrate, fractionated milk protein, concentrated milk fat, whey protein concentrate, dried whey, non-fat dry milk, milk protein isolate, whey protein isolate, or mixtures thereof. Other protein sources, such as soy protein, corn protein, wheat protein, and/or rice protein can be used in part or as the sole protein source. The fat source is preferably a milk fat such as anhydrous milk fat, butter, cream, or mixtures thereof. Other non-dairy fat sources, such as vegetable oil, can be used in part or as the sole fat source. The pH of the dairy concentrate or substrate is generally in the range of about 6 to about 7 and preferably in the range of about 6.5 to about 6.7. In general, at least one of the protein and fat sources will include a dairy ingredient in the practice of this invention to provide a highly useful starting material from which various flavors which are normally or otherwise associated with cheese products can be developed.

A dried protein source, if used, is reconstituted with water. The water is used at a level sufficient to provide total moisture of from about 50 to about 90 percent, preferably from about 53 to about 75 percent in the substrate. The reconstituted protein source is combined with the fat source to provide the substrate. If necessary, the pH of the substrate can be lowered to the proper range (i.e., about 4.6 to about 6 and preferably about 4.8 to about 5.6) by the addition of an edible acid or by use of a lactic acid producing microorganism. Suitable edible acids are non-toxic, inorganic or organic acids, which include hydrochloric acid, acetic acid, maleic acid, tartaric acid, citric acid, phosphoric acid, lactic acid, and mixtures thereof. In preparing the milk concentrate, a homogenization device can be used to reduce the fat droplet particle size and insure homogeneity of the substrate.

In one embodiment, the dairy product used as the starting material is an aqueous milk-derived concentrate or substrate that is a fluid milk concentrate prepared by ultrafiltration (alone or even more preferably combined with diafiltration) or a reconstituted milk substrate prepared from a mixture of an ultrafiltered (UF) or ultrafiltered/diafiltered (UF/DF) milk powder and milk fat. The starting material can be an UF/DF milk having the characteristics such as described in U.S. Pat. No. 6,406,724. These milk concentrates can be used as is or in combination with a supplemental fat source to provide the starting material.

Preferred dairy products useful as starting materials for the methods of the present invention can be prepared from concentrated whole or skim milk with, if desired, added cream or anhydrous milk fat (AMF). The cream or AMF generally is added in an amount of about 0 to about 20 percent, preferably about 2 to about 15 percent, by weight of the mixture. In one embodiment for making the dairy product, skim milk is subjected to conventional ultrafiltration/diafiltration techniques to produce an about 3× to about 8× (preferably about 5×) milk concentrate product. Cream or anhydrous milk fat or a combination thereof is mixed with the milk concentrate. In one exemplary non-limiting embodiment, the resulting mixture is homogenized, and pasteurized under high temperature short time (HTST) conditions, such as at about 76° C. for about 16 seconds in a heat exchanger, and then it is cooled to about 21 to about 27° C. The resulting dairy product can be used as the starting material that is subjected to fermentation to prepare the specific flavoring components of the present invention. Preferably, about 1 to about 2 percent salt is added to the dairy product prior to treatment with the various enzymes/cultures/additives to produce the specific flavoring components. The pasteurized dairy product is a relatively viscous liquid, preferably containing about 25 to about 47 percent solids.

As shown in FIG. 1, the dairy product comprising fluid milk concentrate or whey concentrate, AMF or the like and preferably containing about 1 to about 2 percent salt, can then be divided into one, two or three portions, each of which is treated (i.e., fermented) with specific enzymes, cultures, adjuncts, and other additives for predetermined time periods sufficient to develop specific flavor characteristics. Specific enzymes, cultures, adjuncts, and other additives are provided from which a "sulfury-cheddar" component, a "cheesy" component, a "creamy-buttery" component can be produced. Although not shown in the Figure, each component stream can be subjected to an optional homogenization step before or after fermentation. After fermentation, each portion is then heated to a temperature and held at that temperature for a time sufficient to inactivate the culture and enzyme systems.

After the heat inactivation steps, the flavored components or substrates can be used separately or can be combined in groups of two or three thereof to provide the desired highly flavored cultured cheese concentrate. Preferably, the cultured cheese concentrate of this invention contains 1 to about 80 percent of the sulfury-cheddar component, about 10 to about 90 percent of the cheesy component, and about 10 to about 90 percent of the creamy-buttery component. More preferably, the cultured cheese concentrate of this invention contains about 25 to about 75 percent of the sulfury-cheddar component, about 25 to about 75 percent of the cheesy component, and about 25 to about 75 percent of the creamy-buttery component. The cultured cheese concentrate can be a physical blend of the components which blend is then used to prepare the desired flavored cheese. Alternatively, the cultured cheese concentrate can be formed by individually adding the components to the cheese substrate; the resulting composition is then used to prepare the desired flavored cheese.

The flavor building block materials (i.e., the three flavor components) can be added to a milk substrate, which is then used to form a cheese. Alternatively, the flavor building block materials can be added to an already prepared cheese base. The relative amounts of three components in the cultured cheese concentrate, as well as the total amount of cultured cheese concentrate incorporated, can be varied to achieve particular flavor combinations or flavor notes depending on the desired flavor characteristics. Using the three flavor components and a cheese base, a wide variety of cheese types can be prepared, including those types described in U.S. Pat. No. 6,406,724, which descriptions are incorporated herein by reference.

Generally, the resulting cheeses contain about 1 to about 10 percent of the cultured cheese concentrate and preferably about 2 to about 6 percent thereof. Of course, as those skilled in the art will realize, both the relative and total amounts of the various components can be modified and/or optimized to achieve a particularly desired flavor profile. Additionally, these three components can be used to obtain other flavored cheeses and can be used in various cheese bases (e.g., process cheeses, process cheese-type food products, natural cheeses, cream cheeses, cottage cheeses, and the like).

As indicated in FIG. 1, a common dairy product can be divided into three separate portions or otherwise supplies starting material for each of the three flavor component production schemes in which it is treated (i.e., fermented) with specific enzymes, cultures, adjuncts, and a bacteriocin source added to at least one of the three flavor components, and any other additives, for a predetermined period of time sufficient to develop specific flavor characteristics. Alternatively, different dairy products can be used to prepare each of the flavor component in the production schemes shown in FIG. 1. In another alternative, a dairy product is supplied as a starting material for only a single type of fermentation procedure to focus on development of a particular cheese flavor component. For example, a sulfury-cheddar component can be produced as the sole flavor component of the finished concentrate. Specific enzymes, cultures, adjuncts, and other additives are provided from which the "sulfury-cheddar" component, the "creamy-buttery" component, and the "cheesy" component can be produced. The processes for preparing these components do not require whey drainage steps. The preparation of each of the flavor components will now be described in more detail.

Sulfury-Cheddar Component.

The preparation of the sulfury-cheddar component is preferably carried out in a two-stage process, such as illustrated in FIG. 2. In the first stage, a lactic acid culture and lipase is added to a starting material that is a dairy product such as one described above, and the resulting mixture is maintained at about 15 to about 35° C. for about 10 to about 72 hours to obtain a mixture having a pH of about 5.8 or less.

Lipase (sometimes referred to as an esterase) is an enzyme that is well known in the art. Lipases are typically derived from the gullet tissues of young animals (calves, kids, or lambs), from the pancreas of adult animals, or from microbial sources. Various commercial preparations derived from gullet tissue are available from Degussa, Rhodia, or other such companies under various trade names. The enzyme can be manufactured by grinding edible gullet with salt and non-fat dry milk, drying the mixture, and grinding again. Microbial sources of lipase are, for example, the molds *Candida cylindracea* Type VII, *Aspergilus oryzae*, *A. niger*; *Pencillium roqueforti*, *P. glaucum*, *Rhizopus oryzae*, *Mucor meihei*, *Bacillus* species, and *Chromobacter* species.

In preparing the sulfury-cheddar component, a powdered lipase (preferably a fungal lipase) is generally used at a level of about 0.05 to about 0.4 percent. A suitable fungal lipase is commercially available from Biocatalysis under the tradename Lipomod 187.

The lactic acid culture used should convert lactose to lactic acid and reduce the pH. Examples of useful lactic acid cultures include, for example, *Lactococcus lactis* and *Lactococcus lactis* ssp. *cremoris*. In preparing the sulfury-cheddar component, a lactic acid culture is generally used at a level of about 0.005 to about 0.1 percent, particularly about 0.0075 to 0.015 percent.

The pH of the mixture obtained from the first stage fermentation is adjusted to about 6, or a higher value, with a base, such as by NaOH addition with mixing. A bacteriocin source can added before or after the pH-adjustment step. The pH adjustment on the first fermentation mixture preferably is performed after or approximately about the same time as the addition of the bacteriocin source. For example, addition of the bacteriocin source preferably is done immediately before the pH adjustment. The pH adjusted-mixture should not be permitted to dwell for a long period of time at the higher pH level, i.e., a pH of about 6.0 or higher, in the absence of the antimicrobial additive or otherwise there will be an undesirable increased risk of microbial growth and proliferation.

The bacteriocin source that is optionally used in the preparation of the sulfury-cheddar component can be a bacteriocin compound per se, or a bacteriocin-producing culture under the relevant fermentation conditions such as described herein. Non-limiting examples of such bacteriocins are nisin, such as the nisin variants nisin A and/or nisin Z, or nisin analogs or related lanthionine-containing peptides, such as pediocin, plantaricin, subtilin, epidermin, cinnamycin, duramycin, ancovenin, and Pep 5, individually or in any combination thereof. The bacteriocin source can be a commercial source such as NISAPLIN®, containing about 1 million IU active nisin per gram is available from Aplin & Barrett Ltd., Trowbridge, England. Nisin-producing cultures also can be used including applicable strains of lactic acid bacteria. Nisin can be isolated from natural sources or produced by recombinant DNA technology. Nisin has a molecular weight of approximately 3500, but may also exist as dimers or tetramers having molecular weights of approximately 7,000 and 14,000, respectively.

Either contemporaneous with or soon after bacteriocin addition, a *Brevibacterium* culture (preferably a *Brevibacterium linens* culture), introduced generally at about 1 to about 3 percent, preferably about 2 percent inoculum, or a yeast from the genera *Debaromyces* or *Kluyeromyces*, and a sulfur-containing substrate are incorporated into the mixture. The *Brevibacterium* culture or yeast can convert the sulfur-containing substrate to organoleptically potent sulfur-containing flavor compounds. Where the bacteriocin source is a nisin source or a nisin-producing culture, the nisin source or nisin-producing culture is added in sufficient amounts that the final concentration of active nisin in the mixture undergoing fermentation is at least about 50 IU/g (i.e., about 1.25 ppm), particularly about 100 to about 500 IU/g (i.e., about 2.5 to about 12.5 ppm), and more particularly about 140 to about 160 IU/g (i.e., about 3.5 to about 4 ppm).

The fermentation is then continued for about 16 to about 96 additional hours at a temperature of about 25 to about 45° C. Preferably the *Brevibacterium* culture is used as a flavor adjunct culture to produce sulfur flavor compounds. There should not be any heat inactivation of enzymes/cultures between the two fermentation stages. The enzymes can be produced from various microorganisms or extracted from plant or animal tissues. The various enzymes of the enzyme system are available commercially as dry powders or in liquid form. Preferably, both stages are carried out in a single vessel. Preferably, the reaction mixture is subject to aeration during fermentation to prevent anaerobic conditions and to provide good mixing. Generally, conditions should be maintained to minimize phase separation during fermentation. If phase separation does occur, an optional homogenization step can be used after fermentation.

After completion of the two fermentation steps or stages, the cultures and enzymes are inactivated by heating to about 63 to about 88° C. for about 16 seconds to about 30 minutes, preferably to about 74° C. for about 16 seconds. Preferably, the reaction mixture is recirculated during inactivation to improve heat transfer. Disodium phosphate (DSP; generally about 1 percent) preferably is added to the fermented mixture immediately before the inactivation step.

As noted, the *Brevibacterium* culture is preferably used to form the sulfur-containing compounds. If desired, a microorganism genetically modified so as to provide similar *Brevibacterium* activity can be used in place of the *Brevibacterium* culture. For purposes of this invention, such a genetically modified microorganism is considered to be included within the term "*Brevibacterium* culture."

For purposes of this invention, the "sulfur-containing substrates" are sulfur-containing free amino acids, tri-peptides containing sulfur-containing amino acids, and protein hydrolyslates containing sulfur-containing amino acids. Suitable food protein hydrolysates are available, for example, from Quest International (Hoffman Estates, Illinois) under tradenames N-Z-Amine, N-Z-Case, Hy-Case, and Pepticase, as well as from other suppliers. Preferably, the sulfur-containing substrates include L-methionine, L-glutathione, and L-cysteine. In especially preferred embodiments, the sulfur-containing substrate is a mixture of L-methionine and L-glutathione, a mixture of L-methionine and L-cysteine, or a mixture of L-methionine, L-glutathione, and L-cysteine. The sulfur-containing substrates are generally added at a level of about 0.01 to about 1 percent.

In one particular preferred embodiment, the sulfury-cheddar component is prepared by treating a dairy product comprising a mixture of skim milk concentrate and anhydrous milk fat (or cream) with a lactic acid culture and a lipase in a first stage fermentation, and then, without any inactivation, conducting pH adjustment to about 6.0 and adding the bacteriocin source.

Treatment continues with addition of a *Brevibacterium* culture (preferably a *Brevibacterium linens* culture) and a sulfur-containing substrate such as L-methionine and L-glutathione, L-methionine and L-cysteine, or added L-methionine, L-glutathione, and L-cysteine. The first stage fermentation preferably is carried out for about 10 to about 24 hours at a temperature of about 27 to about 32° C. The second stage fermentation preferably is carried out for about 16 to about 96 hours at a temperature of about 22 to about 28° C. Although it is preferred that the two stages be carried out sequentially as shown in FIG. 2, they may be combined into a single fermentation step. For example, such a single stage fermentation process is generally carried out at about 25 to about 30° C. for about 38 to 110 hours.

Other sulfur-containing substrates, if used, are generally present in a level of about 0.01 to about 1 percent. Fermentation is preferably carried out with aeration to prevent the reaction mixture from becoming anaerobic and to provide good mixing. Aeration is preferably effected using air introduced into the reaction mixture using a diffusion plate or an in-line air sparger. If appropriate (i.e., if phase separation occurs), the reaction mixture can optionally be homogenized prior to further treatment. After fermentation, the cultures and enzymes are inactivated by heating under conditions described above. Preferably, aeration is discontinued throughout the heat inactivation process.

The sulfur-containing substrates are added to assist in the production of sulfur compounds important in cheddar, especially sharp cheddar, flavor development. Preferred sulfur containing substrates include L-methionine, L-glutathione, L-cysteine, and mixtures thereof. The L-methionine is used for sulfur compound generation through the action of the *Brevibacterium* culture or the yeast (a *Brevibacterium linens* culture is preferred). The tri-peptide L-glutathione (i.e., glutamine-cysteine-glycine) and the amino acid L-cysteine, in addition to serving as substrates, also act as processing aids to create redox equilibrium conditions which facilitate flavor production by the generation of desirable sulfur flavor compounds (i.e., methanethiol, dimethyldisulfide, and dimethyltrisulfide). Hydrolysis of L-glutathione to free amino acids by microbial enzymes is expected during the fermentation period. Further hydrolysis may also occur during subsequent heat treatment (i.e., during inactivation and/or incorporation into cheese base). Generally, expected levels of L-glutathione in the final cheese product (i.e., the flavored cheese product produced with the present cheese flavor system) are less than about 10 ppm.

By way of example, the use of a *Brevibacterium* culture to generate volatile sulfur compounds (VSC) from the sulfur-containing substrate methionine takes place optimally at pH 7, with less than 20 percent of this activity occurring at pH's less than 5.8. At pH 5.8 to 6, *B. linens* is capable of producing significant levels of VSC. However, in reaction mixture systems such as described in U.S. Pat. No. 6,406,724, conducting the fermentation at pH's above 5.8 would greatly increase the risk of contamination from spoilage microorganisms.

The resulting sulfury-cheddar component that is produced is typically a liquid or paste with a moisture content in the range of from about 50 to about 80 percent, preferably from about 53 to about 75 percent. The sulfury-cheddar component can be spray dried to provide a powder with or without the addition of carrier materials, such as whey concentrate or maltodextrins. The sulfury-cheddar component generally has the flavor characteristics and profile shown in U.S. Pat. No. 6,406,724, and reference is made thereto. The sulfury-cheddar component likely contains other potent aroma or flavor compounds, including sulfur-containing compounds, which have not been detected.

The sulfury-cheddar component prepared according to this invention develops the sulfury-cheddar flavor characteristics within a shorter period of time the sulfury-cheddar components prepared using the methods described in U.S. Pat. No. 6,406,724. In particular, the sulfury-cheddar flavor component of this invention can be prepared to have a commercially suitable flavor developed within about 26 to 114 hours, instead of the typical minimum of about 8 days required to achieve comparable flavor development in the sulfury-cheddar component made according to the methods described in U.S. Pat. No. 6,406,724. In one particular embodiment, the treating of the first dairy product, lipase and lactic acid culture of the first stage fermentation is conducted over a period of time of about 10 to about 24 hours, and the treating of the bacteriocin-treated mixture in the second stage fermentation is conducted over a period of time of about 38 to about 50 hours, such that the total fermentation time is about 48 to about 68 hours (i.e., about 2 to less than about 3 days).

The addition of the bacteriocin source in the reaction mixture used for making this sulfury-cheddar component permits adjustment upward to higher pH's of approximately 6 or even higher during one or more stages of fermentation such that flavor development can be accelerated yet without a problem arising from the outgrowth of undesirable food spoilage microorganisms at the higher pH conditions. Use of this technology permits for the production of similar levels of VSC in the sulfury component within an accelerated period of time as compared to similar preparation schemes that omit the bacteriocin source.

Cheesy Component.

The preparation of the cheesy component is preferably carried out in a two stage process as illustrated in FIG. 3. In the first stage, a dairy product such as described above is inoculated with a lactic acid bacteria (preferably *Lactobacillus helveticus* which has a high level of aminopeptidase) and then maintained at about 15 to about 45° C. for about 10 to about 24 hours to obtain a mixture having a pH of about 5.4 or less.

Optionally, a protease, aminopeptidase, lipase, or combinations thereof also could be added in the first stage. The types of lipase and addition rates for lipase are similar to those described above for the sulfury-cheddar component production. The peptidase is an enzyme with peptidase activity, preferably amino peptidase activity. Such enzymes act upon bitter flavored peptides that result from protein hydrolysis. The peptidase can be a purified enzyme material or can be cells of a microbe that produces peptidase activity. The culture cells can be spray dried, freeze-dried, frozen, or freshly cultured cells and can be non-growing or capable of propagation within the substrate. Preferably, the peptidase enzyme is used in powder form, although a liquid form also could be used.

A bacteriocin source is optionally added to the mixture obtained from the first stage fermentation. The bacteriocin source used in this mixture can be any one or more of the bacteriocin materials identified earlier. As in the preparation of the sulfury-cheddar component described herein, a nisin source can be added sufficient that the final concentration of nisin in the mixture undergoing fermentation is at least about 50 IU/g (i.e., about 1.25 ppm), particularly about 100 to about 500 IU/g (i.e., about 2.5 to about 12.5 ppm), and more particularly about 140 to about 160 IU/g (i.e., about 3.5 to about 4 ppm).

Optionally, the pH of the mixture obtained from the first stage fermentation could be adjusted to about 6.0 or higher to further facilitate flavor development. Preferably, the optional pH adjustment, if done in the preparation of the cheesy component, is performed immediately prior to the addition of the bacteriocin source.

In a second stage fermentation conducted, the mixture is treated with an enzyme system including a lipase, a protease, or mixture thereof, and a peptidase. The mixture from stage 1, now including the bacteriocin source, is treated with the enzyme system at a temperature of from about 20 to about 50° C. for a period of from about 24 to about 48 hours, preferably from about 42 to about 46 hours, The lipase enzymes useful in this stage include those previously described, and preferably are a fungal lipase. A powdered fungal lipase is generally used at a level of about 0.05 to about 0.4 percent. Proteases are enzymes that can be derived from fungal, plant, or animal sources, as is well-known in the art. Examples of suitable proteases include Enzeco Neutral Bacterial Protease 2X, available from Enzyme Development Corp., and Promod 215 available from Biocatalyst. The powdered proteases are generally used at levels of from about 0.01 to about 1 percent, preferably at levels of from 0.1 to about 0.4 percent.

The enzyme with peptidase activity used in this second stage fermentation include those described above in connection with the first stage. For instance, *Lactobacillus helveticus* can be a lactic acid bacteria with aminopeptidase activity for this second stage fermentation. The peptidase enzyme in concert with the protease enzyme creates a high concentration of free amino acids and small peptides that contribute to the cheese flavor. The aminopeptidase, such as *Lactobacillus helveticus* cells, can be used at a level of from about 0.01 to about 3 percent.

The enzymes used in the system or slurry applied to this second stage fermentation can be produced from various microorganisms or extracted from plant or animal tissues. The various enzymes of the enzyme system are available commercially as dry powders or in liquid form.

The desired flavor level can be judged organoleptically and can be estimated through analytical measurements, such as pH, titratable acidity, and concentration of free fatty acids and amino acids.

When the target flavor is reached, the enzymes are deactivated by heating the mixture to a temperature of from about 65 to about 105° C., and holding the substrate at the elevated temperature for a sufficient time to insure complete enzyme deactivation (e.g., from about 5 to about 60 minutes). Preferably, about 1 percent disodium phosphate (DSP) is added to the mixture resulting from the second stage fermentation immediately before conducting the heat inactivation step.

In the second stage fermentation, the enzymes may be added sequentially or all at once to provide desired flavor profile. There is no inactivation step between the sequential addition of the enzymes.

The process can be, and preferably is, conducted in a single vessel without transfer to additional vessels for sequential steps. The vessel is preferentially provided with mixing equipment to insure good contact between the enzymes and the substrate materials and to maintain the solids in suspension. A scraped surface mixing tank is preferred. A recirculation and homogenization device may be employed to prevent segregation of a fat phase from aqueous materials and to aid in maintaining the solids in suspension. Water may be added during the fermentation to maintain desired moisture content and acidic or basic materials may be added to adjust the pH.

In a particular preferred embodiment, the cheesy component is prepared by treating a salted milk concentrate with lipase and a microorganism with peptidase activity, such as *Lactobacillus helveticus*, at 35 to 39° C. for about 12 to about 16 hours, followed by treating the mixture resulting from the first stage with nisin as the bacteriocin, and then an enzyme system including a neutral bacterial protease, a fungal protease, an enzyme with (amino)peptidase activity, and a fungal lipase for about 42 to about 46 hours at a temperature of about 38 to about 42° C. as shown in FIG. 2.

Fermentation is preferably carried out with recirculation using a shear pump to prevent the reaction mixture from becoming anaerobic and to provide good mixing. After fermentation, the enzymes are inactivated by applying heat (generally about 185° F. for about 30 minutes); preferably, recirculation is continued throughout the heat inactivation process but without using the shear pump.

The resulting cheesy component that is produced is typically a liquid or paste with a moisture content in the range of from about 50 to about 70 percent, preferably from about 53 to about 65 percent. The cheesy component can be spray dried to provide a powder with or without the addition of carrier materials, such as whey concentrate or maltodextrins. The cheesy component likely contains other potent aroma or flavor compounds that have not been detected.

The preferred cheesy component prepared according to this invention generally has its flavor characteristics (i.e., a cheesy "bite") developed within a significantly shorter ripening period than similar components prepared using the specific starting materials and procedures described in U.S. Pat. No. 6,406,724.

Creamy-Buttery Component.

A creamy-buttery component also can be prepared according to this invention, although the reductions in the time period required for flavor development have not been observed to be as dramatic as those observed for the sulfury-cheddar and cheesy components made according to this invention as compared to respective components made according to U.S. Pat. No. 6,406,724. However, the creamy-buttery components made according to this invention have superior microbial stability and spoilage organism control. When used in combination with other flavor components described herein, it is preferable that the creamy-buttery component also be prepared with bacteriocin incorporation as described herein so that it may not influence the microbial stability of a flavor combination as a whole. For example, one measure of stability in this respect is the shelf life of the product.

The preparation of the creamy-buttery component is preferably carried out in a two stage process. The preparation of the creamy-buttery component is carried out by adding a lactic acid culture to a dairy product such as described herein and then fermenting the mixture at about 20 to 35° C. for about 10 to about 24 hours. In a second stage, a bacteriocin source and a diacetyl-producing flavor culture are then added and the fermentation continued at about 20 to about 35° C., for about 1 to about 10 days, preferably about 2 to about 5 days. Optionally, about 0.1 to about 0.8 percent of a citrate salt (preferably sodium citrate) is added to either the first or second stage fermentation to enhance flavor development. The enzymes can be produced from various microorganisms or extracted from plant or animal tissues. The various enzymes of the enzyme system are available commercially as dry powder or in liquid form. Preferably, the reaction mixture is subject to aeration during fermentation to prevent anaerobic conditions and to provide good mixing. Phase separation is not a significant problem during fermentation. After completion of the fermentation step, the cultures and enzymes are inactivated by heating to about 63 to about 88° C. for about 16 seconds to about 30 minutes, preferably to about 74° C. for about 16 seconds.

In a particular preferred embodiment, the creamy-buttery component is prepared by treating milk concentrate (pH about 6 to about 6.7) with a lactic acid culture and a pregastric esterase in a first stage and then, without any inactivation, adding a bacteriocin source (generally about 50-100 IU/g), sodium citrate (generally about 0.05 to about 5 percent) and further treating with one or more cultures which have the ability to produce diacetyl from citrate. Preferred diacetyl-producing cultures include *Leuconostoc* and *Lactococcus Lactis* ssp. *Lactis biovar. diacetylactis*. The first stage fermentation is carried out for about 10 to about 24 hours at a temperature of about 22 to about 26° C. The second stage fermentation is carried out for about 1 to about 10 days at a temperature of about 22 to about 26° F. Although it is preferred that the two stages be carried out sequentially as shown in FIG. 1 of U.S. Pat. No. 6,406,724, which is incorporated herein by reference, they may be combined into a single fermentation step. Such a single stage fermentation process is generally carried out at a temperature of about 21 to 32° F. for about 1 to about 5 days.

All patents, patent applications, patent publications, and other publications cited in the present specification are hereby incorporated by reference.

EXAMPLES

The following examples further illustrate the present invention. Parts and percentages are given by weight unless otherwise indicated.

Example 1

This example illustrates the preparation of a sulfury-cheddar component as a flavor concentrate. This process also was used to determine its effects on the ripening time and flavor development of a sulfury-cheddar component as compared to that described in U.S. Pat. No. 6,406,724.

To prepare a starting material, i.e., a dairy product, skim milk was subjected to conventional ultrafiltration/diafiltration techniques to produce an about 5× milk concentrate product. The milk concentrate was combined with anhydrous milk fat (AMF) in amounts sufficient to obtain a standardized milk with a fat content of 54 percent based on dry matter. In addition, about 1 to about 2 percent salt was added to the combination of the AMF and milk concentrate. The resulting mixture was homogenized, and pasteurized under high temperature short time (HTST) conditions at about 73° C. for about 16 seconds in a heat exchanger, and then it was cooled to about 25° C. The resulting dairy product contained 41.8 percent solids, 22.6 percent fat, and 15.4 percent protein and had a pH of 6.7. The resulting dairy product was used to prepare the specific flavoring components of these examples.

Lactic acid starter culture (0.01 percent; *Lactococcus lactis* and *Lactococcus lactis* ssp. *cremoris*; R603 from Chr. Hansens, Inc.), and lipase (0.3 percent) were added to the dairy product and fermented in a first stage for 14 hours at 30° C. until the resulting mixture reached a pH of 5.2.

The pH of the mixture obtained from the first stage fermentation was adjusted to 6 using NaOH with mixing. NISAPLIN® was added to the pH-adjusted mixture providing 150 U/g in final concentration in the mixture subjected to the second stage fermentation. L-methionine (0.15 percent), L-glutathione (0.1 percent), and an activated culture of *Brevibacterium linens* (2 percent) were also added to the pH-adjusted first stage fermentation product to initiate the second stage of the fermentation process. The second stage fermentation was continued for an additional 44 hours with aeration at a temperature of 25° C.; the pH of the reaction mixture at the end of the second stage was 6.0. The resulting sulfury-cheddar component had 1 percent DSP added with mixing and then was heated to 74° C. for 16 seconds in order to inactivate the cultures and enzymes and to extend the shelf life of the product. A relatively small loss of sulfur compounds was observed in the deactivation step. The sulfury-cheddar component had a total solids of about 41 percent and could, if desired, be spray dried to form a sulfury-cheddar flavor powder.

A sulfury-cheddar component, Ex. 1, was made according to the above described protocol, and a comparison cheese flavor component, Comp. Ex. A, was made using the same protocol except the nisin addition was omitted. Samples of each Ex. 1 and Comp. Ex. A were subjected to aroma extract dilution analyses performed at a series of different flavor dilution factors (FD's) of 20, 84 and 420. The diluted samples were passed through a gas chromatograph (GC), and different flavor aromas exited the GC at different time intervals. The streams exiting the GC were split into one stream that was qualitatively sniffed by a person such that a yes ("Y") or no ("N") determination was made on the presence or absence, respectively, of the various flavors listed in Tables 1 and 2. Another stream was subjected to quantitative analysis, and those flavor profile results are reported in Table 3 (Ex. 1, with nisin) and Table 4 (Comp. Ex. A, without nisin).

The results of the qualitative flavor profile analyses were as follows:

TABLE 1

| | | FD factor | | |
|---|---|---|---|---|
| No. | Flavor | 20 | 84 | 420 |
| (Example 1 - with Nisin) | | | | |
| 1 | Methanethiol | Y | Y | Y |
| 2 | Trimethyl amine | N | N | N |
| 3 | DMDS | Y | Y | Y |
| 4 | S-Me propanethioate | N | N | N |
| 5 | sulfurous, brothy, oily | Y | Y | Y |
| 6 | potato | N | N | N |
| 7 | Methyl thiobutyrate | Y | N | N |
| 8 | potato, methional | Y | Y | N |
| 9 | 1-(Methylthio)-pentane | N | N | N |
| 11 | DMTS | Y | Y | Y |
| 14 | pungent sulfidy, plastic | Y | Y | N |
| 15 | sulfidy | Y | Y | Y |
| 16 | garlic, sulfidy | Y | Y | Y |
| (Comparative Example A - without Nisin) | | | | |
| 1 | Methanethiol | Y | Y | N |
| 2 | Trimethyl amine | Y | N | N |
| 3 | DMDS | Y | Y | N |
| 4 | S-Me propanethioate | N | N | N |
| 5 | sulfurous, brothy, oily | Y | Y | N |
| 6 | potato | N | N | N |
| 7 | Methyl thiobutyrate | Y | N | N |
| 8 | potato, methional | Y | N | N |
| 9 | 1-(Methylthio)-pentane | N | N | N |
| 10 | sulfidy, onion | N | N | N |
| 11 | DMTS | Y | Y | Y |
| 12 | fast sulfidy | N | N | N |
| 13 | fast sulfidy | N | N | N |
| 14 | pungent sulfidy, plastic | Y | N | N |
| 15 | sulfidy | Y | Y | N |
| 16 | garlic, sulfidy | Y | Y | N |

As apparent from comparing the results of Tables 1 and 2, the flavor profile for the sulfury-cheddar component representing the present invention, i.e., Ex. 1, is clearly superior to that measured for the comparison sample. For example, a large number and variety of sulfur compounds or sulfur-containing substances methanethiol, dimethyldisulfide (DMDS), sulfurous-brothy-oily, methional, pungent sulfidy-plastic, sulfidy, and garlic-sulfidy were detectable at higher flavor dilution (FD) values for Ex. 1 representing an embodiment of the present invention than for the comparison sample. The results of the quantitative flavor profile analyses performed on samples were as follows:

TABLE 3

(Example 1 - with Nisin)

| Constituent | Amount |
| --- | --- |
| Methanethiol | 0.4 ppm |
| Dimethyldisulfide | 0.6 ppm |
| Dimethyltrisulfide | Not detected |

TABLE 4

(Comparative Example A - without Nisin)

| Constituent* | Amount |
| --- | --- |
| Methanethiol | 0.1 ppm |
| Dimethyldisulfide | 0.4 ppm |
| Dimethyltrisulfide | Not detected |

Example 2

An experiment was performed in which the process of Example 1 was modified such that the bacteriocin was generated in situ by the addition of a nisin producing strain of *Lactococcus* in place of NISAPLIN®. Otherwise, the process was the same as that described in Example 1. The nisin-producing strain of *Lactococcus*, which was isolated from raw milk, has been described in U.S. Pat. No. 5,715,811, which is hereby incorporated by reference. The flavor profiles of the product obtained after the second stage fermentation were similar to those observed for the Ex. 1 sample, which were described above.

Example 3

Another experiment was performed for the production of an enzyme modified type cheese flavoring. This process also was used to determine its effects on the ripening time and flavor development of a cheesy component as compared to that described in U.S. Pat. No. 6,406,724.

A dairy product was prepared in a similar manner and having a similar composition as described in Example 1. The dairy product was maintained in an agitated jacketed vessel with continuous recirculation using a shear pump during a two-stage fermentation process. In the first stage, 0.1 percent *Lactobacillus helveticus* culture and 0.3 percent lipase was added to the dairy product and the resulting mixture was maintained at about 37° C. for 14 hours to obtain a mixture having a pH of about 5.0. NISAPLIN® was added to the mixture obtained from the first stage fermentation. Optionally, and although not done for this example, the pH of the mixture could be adjusted to about 6.0 or higher with a base, such as by NaOH addition, prior to the introduction of the NISAPLIN®.

Then, in a second stage fermentation performed, the mixture was treated with an enzyme slurry containing neutral bacterial protease (about 0.18 percent; Enzeco Neutral Bacterial Protease 2X, Enzyme Development Corp.), *Lactobacillus helveticus* (about 0.14 percent; EnzoBact, Medipharm) as an enzyme having aminopeptidase activity, fungal protease (about 0.28 percent; Promod 215, Biocatalysts), and fungal lipase (about 0.28 percent; Lipomod 187, Biocatalysts); percentages are based on the total weight of the fermentation mixture. Fermentation was continued for 44 hours at 40° C. with continuous agitation and recirculation using the shear pump to maintain an emulsion. After completion of the fermentation, 1 percent DSP was added to the resulting mixture and the enzymes were inactivated by heating to 85° C. for 30 minutes; aeration was continued during inactivation but without using the shear pump. The cheesy component had a total solids of about 43 percent and could, if desired, be spray dried to form a cheesy flavor powder. The flavor profile for the resulting cheesy component were comparable to those indicated for the cheesy component described in U.S. Pat. No. 6,406,724. Therefore, the desired flavor profiles were maintained in an accelerated fermentation scheme and where microbial stability of the cheesy flavor component was significantly bolstered.

Example 4

This example illustrates the preparation of a sulfury-cheddar component using a bacteriocin in combination with a secondary anti-microbiological agent. Skim milk was subjected to conventional ultrafiltration/diafiltration techniques to produce an about 5× milk concentrate product. The milk concentrate was combined with anhydrous milk fat (AMF) in amounts sufficient to obtain a standardized milk with a fat content of 54 percent based on dry matter; about 1 to about 2 percent salt was added. The resulting mixture was homogenized, pasteurized under high temperature short time (HTST) conditions at about 73° C. for about 16 seconds, and then cooled to about 25° C. The resulting dairy product contained about 41.8 percent solids, about 22.6 percent fat, and about 15.4 percent protein; the pH was about 6.7. The resulting dairy product was used to prepare the specific flavoring components of this example.

Lactic acid starter culture (0.01 percent; *Lactococcus lactis* and *Lactococcus lactis* ssp. *cremoris*; R603 from Chr. Hansen, Inc.) and lipase (0.3 percent) were added to the dairy product and fermented in a first stage for 14 hours at about 30° C. until the resulting mixture reached a pH of 5.2. The pH of the mixture obtained from the first stage fermentation was adjusted to 6.0 using NaOH with mixing. NISAPLIN® was added to the pH-adjusted mixture providing 150 U/g in final concentration and 0.1% EDTA (i.e., the secondary antimicrobial agent) was added. L-methionine (0.15 percent), L-glutathione (0.1 percent), and an activated culture of *Brevibacterium linens* (2 percent) were also added to the pH-adjusted mixture to initiate the second stage of the fermentation process. The second stage fermentation was continued for an additional 44 hours with aeration at a temperature of about 25° C.; the pH of the reaction mixture at the end of the second stage was 6.0. About 1 percent disodium phosphate was added with mixing. The resulting composition was heated to 74° C. for 16 seconds in order to inactivate the cultures and enzymes. A relatively small loss of sulfur compounds was observed in this deactivation step. The resulting sulfury-cheddar component prepared with nisin and EDTA had a total solids of about 41 percent and could, if desired, be spray dried to form a sulfury-cheddar flavor powder. A comparison sulfury-cheddar component (containing nisin) was prepared in essentially the same manner except that EDTA was included.

Challenge studies were also carried out wherein about $1.2 \times 10^3$ nisin resistant *Bacillus* sp isolated from milk were added to both the inventive and control samples prior to second stage fermentation. *Bacillus* levels were determined at the end of the second stage fermentation. For the comparison sample (i.e., nisin treated), the *Bacillus* level at the end of the second stage fermentation was about $1.5 \times 10^5$. For the nisin/EDTA treated sample, bacillus level at the end of the second stage fermentation was about $1.4 \times 10^3$.

What is claimed is:

1. A flavoring system for food products, said system comprising a sulfury-cheddar flavor component, a cheesy flavor component and a creamy-buttery component, wherein the sulfury-cheddar flavor component is prepared by treating a first dairy product containing an aqueous protein source and fat source combination with lipase and a lactic acid culture at a temperature of about 15 to about 35° C. for about 10 to about 72 hours to obtain a first mixture having a pH of about 5.8 or less; adjusting the pH of the first mixture to about 6 or higher to obtain a second mixture; treating the second mixture with a sulfur-containing substrate, and a microorganism that can convert the sulfur-containing substrate to sulfur-containing flavor compounds, and optionally a first bacteriocin source, at a temperature of about 15 to about 35° C. for about 12 to about 96 hours to obtain a third mixture; heating the third mixture at a temperature sufficient to inactivate the cultures and enzymes in the third mixture to form the sulfury-cheddar flavor component;

wherein the cheesy flavor component is prepared by treating a second dairy product containing an aqueous protein source and fat source combination with a lactic acid culture at a temperature of about 15 to about 45° C. for about 10 to about 24 hours to obtain a fourth mixture; treating the fourth mixture with a lipase, a protease, and an aminopeptidase, and optionally a second bacteriocin source, at a temperature of about 20 to about 50° C. for about 16 to about 96 hours to obtain a fifth mixture; treating the fifth mixture at a temperature sufficient to inactivate the cultures and enzymes in the fifth mixture to form the cheesy flavor component;

wherein the creamy-buttery flavor component is prepared by treating a third dairy product containing an aqueous protein source and fat source combination with a lactic acid culture at a temperature of about 20 to about 35° C. for about 10 to about 24 hours to obtain a sixth mixture having a pH of about 5.4 or less; treating the sixth mixture with a diacetyl-producing flavor culture, and optionally a third bacteriocin source, at a temperature of about 20 to about 35° C. for about 16 to about 240 hours to obtain a seventh mixture; heating the seventh mixture at a temperature sufficient to inactivate the cultures and enzymes in the seventh mixture to form the creamy-buttery flavor component;

wherein at least one of the first, second, and third bacteriocin sources is included, and wherein the sulfury-cheddar component, the cheesy component and the creamy-butter component of the flavoring system can be incorporated in varying amounts into food products to produce a variety of flavors.

2. The flavoring system of claim 1, wherein the at least one of the first, second, and third bacteriocin sources included each comprise nisin.

3. The flavoring system of claim 1, wherein the at least one of the first, second, and third bacteriocin sources included independently are selected from the group consisting of nisin A, nisin Z, pediocin, lactosin, lactacins, carnocin, enterocin, plantaricin, subtilin, epidermin, cinnamycin, duramycin, and ancovenin, individually or in any combination thereof.

4. The flavoring system of claim 1, wherein the at least one of the first, second, and third bacteriocin sources included comprises a bacteriocin-producing culture.

5. The flavoring system of claim 1, wherein the first and second bacteriocin sources are included and independently comprise nisin, wherein nisin is present in a first amount of about 50 to about 500 IU/g in the third mixture, and nisin is present in a second amount of about 50 to about 500 IU/g in the fifth mixture.

6. The flavoring system of claim 1, wherein the lactic acid culture used to prepare the sulfury-cheddar flavor component is *Lactococcus lactis* and *Lactococcus lactis* ssp. *cremoris*; and wherein the lipase used to prepare the cheesy flavor component is a fungal lipase, the protease used to prepare the cheesy flavor component is a neutral bacterial protease, a fungal protease, or mixtures thereof, and the aminopeptidase used to prepare the cheesy flavor component is *Lactobacillus helveticus*.

7. The flavoring system of claim 1, wherein the first, second and third dairy products are independently selected from a milk concentrate, a milk substrate, a whey concentrate, a whey substrate, individually or in a combination thereof.

8. The flavoring system of claim 1, wherein the sulfur-containing substrate is L-methionine, L-glutathione, and L-cysteine, or mixtures thereof.

9. The flavoring system of claim 1, wherein the first bacteriocin source is included.

10. The flavoring system of claim 1, wherein the second bacteriocin source is included.

11. The flavoring system of claim 1, wherein at least one of the first, second, and third bacteriocin sources is used in combination with a secondary antimicrobial agent.

12. A food product comprising a cultured cheese concentrate, said cultured cheese concentrate comprising a sulfury-cheddar component, a cheesy component, and a creamy-buttery component, wherein the sulfury-cheddar component is prepared by treating a first dairy product containing an aqueous protein source and fat source combination with lipase and a lactic acid culture at a temperature of about 15 to about 35° C. for about 10 to about 72 hours to obtain a first mixture having a pH of about 5.8 or less; adjusting the pH of the first mixture to about 6 or higher to obtain a second mixture; treating the second mixture with a sulfur-containing substrate, and a microorganism that can convert the sulfur-containing substrate to sulfur-containing flavor compounds, and optionally a first bacteriocin source, at a temperature of about 15 to about 35° C. for about 12 to about 96 hours to obtain a third mixture; heating the third mixture at a temperature sufficient to inactivate the cultures and enzymes in the third mixture to form the sulfury-cheddar component;

wherein the cheesy component is prepared by treating a second dairy product containing an aqueous protein source and fat source combination with a lipase and a peptidase at a temperature of about 20 to about 45° C. for about 10 to about 24 hours to obtain a fourth mixture; treating the fourth mixture with a lipase, a protease, and an aminopeptidase, and optionally a second bacteriocin source, at a temperature of about 20 to about 50° C. for about 16 to about 96 hours to obtain a fifth mixture; treating the fifth mixture at a temperature sufficient to inactivate the cultures and enzymes in the fifth mixture to form the cheesy component;

wherein the creamy-buttery flavor component is prepared by treating a third dairy product containing an aqueous protein source and fat source combination with a lactic acid culture at a temperature of about 20 to about 35° C. for about 10 to about 24 hours to obtain a sixth mixture having a pH of about 5.4 or less; treating the sixth mixture with a diacetyl-producing flavor culture, and optionally a third bacteriocin source, at a temperature of about 20 to about 35° C. for about 16 to about 240 hours to obtain a seventh mixture; heating the seventh mixture at a temperature sufficient to inactivate the cultures and enzymes in the seventh mixture to form the creamy-buttery component;

wherein at least one of the first, second, and third bacteriocin sources is included.

13. The food product of claim 12, wherein said food product comprises about 1 to about 10 weight percent said cultured cheese concentrate, and said cultured cheese concentrate comprises 1 to about 80 percent of the sulfury-cheddar component, about 10 to about 90 percent of the cheesy component, and about 10 to about 90 percent of the creamy-buttery component.

14. The food product of claim 13, wherein said food product comprises about 1 to about 10 weight percent said cultured cheese concentrate, and said cultured cheese concentrate comprises 25 to about 75 percent of the sulfury-cheddar component, about 25 to about 75 percent of the cheesy component, and about 25 to about 75 percent of the creamy-buttery component.

15. The food product of claim 13, wherein the food product comprises a cheese base.

16. The food product of claim 12, wherein the food product comprises a cheese base selected from process cheese, natural cheese, cream cheese, or cottage cheese.

17. The food product of claim 12, wherein the at least one of the first, second and third bacteriocin sources included each comprise nisin.

18. The food product of claim 12, wherein the at least one of the first, second, and third bacteriocin sources included independently are selected from the group consisting of nisin A, nisin Z, pediocin, lactosin, lactacins, carnocin, enterocin, plantaricin, subtilin, epidermin, cinnamycin, duramycin, and ancovenin, individually or in any combination thereof.

19. The food product of claim 12, wherein the at least one of the first, second, or third bacteriocin sources included comprises a bacteriocin-producing culture.

20. The food product of claim 12, wherein the first and second bacteriocin sources are included and independently comprise nisin, wherein nisin is present in a first amount of about 50 to about 500 IU/g in the third mixture, and nisin is present in a second amount of about 50 to about 500 IU/g in the fifth mixture.

21. The food product of claim 12, wherein the lactic acid culture used to prepare the sulfury-cheddar flavor component is *Lactococcus lactis* and *Lactococcus lactis* ssp. *cremoris*; and wherein the lipase used to prepare the cheesy flavor component is a fungal lipase, the protease used to prepare the cheesy flavor component is a neutral bacterial protease, a fungal protease, or mixtures thereof, and the aminopeptidase used to prepare the cheesy flavor component is *Lactobacillus helveticus*.

22. The food product of claim 12, wherein the first, second and third dairy products are independently selected from a milk concentrate, a milk substrate, a whey concentrate, a whey substrate, individually or in a combination thereof.

23. The food product of claim 12, wherein the sulfur-containing substrate is L-methionine, L-glutathione, and L-cysteine, or mixtures thereof.

24. The food product of claim 12, wherein the first bacteriocin source is included.

25. The food product of claim 12, wherein the second bacteriocin source is included.

26. The food product of claim 12, wherein at least one of the first, second, and third bacteriocin sources is used in combination with a secondary antimicrobial agent.

27. A method for preparing a flavored cheese using a cultured cheese concentrate, said method comprising:
1) preparing a cheese or dairy base; and
2) incorporating about 1 to about 10 percent of a cultured cheese concentrate into the cheese or dairy base to form the flavored cheese;

wherein the cultured cheese concentrate comprises 1 to about 80 percent of a sulfury-cheddar component, about 10 to about 90 percent of a cheesy component, and about 10 to about 90 percent of a creamy-buttery component; and wherein the sulfury-cheddar component is prepared by treating a first dairy product containing an aqueous protein source and fat source combination with lipase and a lactic acid culture at a temperature of about 15 to about 35° C. for about 10 to about 72 hours to obtain a first mixture having a pH of about 5.8 or less; adjusting the pH of the first mixture to about 6 or higher to obtain a second mixture; treating the second mixture with a sulfur-containing substrate, and a microorganism that can convert the sulfur-containing substrate to sulfur-containing flavor compounds, and optionally a first bacteriocin source, at a temperature of about 15 to about 35° C. for about 12 to about 96 hours to obtain a third mixture; heating the third mixture at a temperature sufficient to inactivate the cultures and enzymes in the third mixture to form a sulfury-cheddar component;

wherein the cheesy component is prepared by treating a second dairy product containing an aqueous protein source and fat source combination with a lipase and a peptidase at a temperature of about 20 to about 45° for about 10 to about 24 hours to obtain a fourth mixture; treating the fourth mixture with a lipase, a protease, and an aminopeptidase, and optionally a second bacteriocin source, at a temperature of about 20 to about 50° C. for about 16 to about 96 hours to obtain a fifth mixture; treating the fifth mixture at a temperature sufficient to inactivate the cultures and enzymes in the fifth mixture to form a cheesy component;

wherein the creamy-buttery flavor component is prepared by treating a third dairy product containing an aqueous protein source and fat source combination with a lactic acid culture at a temperature of about 20 to about 35° C. for about 10 to about 24 hours to obtain a sixth mixture having a pH of about 5.4 or less; treating the sixth mixture with a diacetyl-producing flavor culture, and optionally a third bacteriocin source, at a temperature of about 20 to about 35° C. for about 16 to about 240 hours to obtain a seventh mixture; heating the seventh mixture at a temperature sufficient to inactivate the cultures and enzymes in the seventh mixture to form a creamy-buttery component;

wherein at least one of the first, second, and third bacteriocin sources is included.

28. The method of claim 27, wherein the cheese or dairy base is selected from process cheese, natural cheese, cream cheese, or cottage cheese.

29. The method of claim 27, wherein the at least one of the first, second, and third bacteriocin sources included each comprise nisin.

30. The method of claim 27, wherein the at least one of the first, second, and third bacteriocin sources included independently are selected from the group consisting of nisin A, nisin Z, pediocin, lactosin, lactacins, carnocin, enterocin, plantaricin, subtilin, epidermin, cinnamycin, duramycin, and ancovenin, individually or in any combination thereof.

31. The method of claim 27, wherein the at least one of the first, second, and third bacteriocin sources included comprises a bacteriocin-producing culture.

32. The method of claim 27, wherein the first and second bacteriocin sources are included and independently comprise nisin, wherein nisin is present in a first amount of about 50 to about 500 IU/g in the third mixture, and nisin is present in a second amount of about 50 to about 500 IU/g in the fifth mixture.

33. The method of claim 27, wherein the lactic acid culture used to prepare the sulfury-cheddar flavor component is *Lactococcus lactis* and *Lactococcus lactis* ssp. *cremoris*; and wherein the lipase used to prepare the cheesy flavor component is a fungal lipase, the peptidase used to prepare the cheesy flavor component is *Lactobacillus helveticus*, the protease used to prepare the cheesy flavor component is a neutral bacterial protease, a fungal protease, or mixtures thereof, and the aminopeptidase used to prepare the cheesy flavor component is *Lactobacillus helveticus*.

34. The method of claim 27, wherein the cultured cheese concentrate is a dried powder.

35. The method of claim 27, wherein the first bacteriocin source is included.

36. The method of claim 27, wherein at least one of the first, second, and third bacteriocin sources is used in combination with a secondary antimicrobial agent.

37. A method for preparing a flavored cheese using a cultured cheese concentrate, said method comprising:
   a) preparing a milk substrate suitable for producing a cheese;
   b) incorporating about 1 to about 10 percent by weight of the cultured cheese concentrate into the milk substrate;
   c) treating the milk substrate and cultured cheese concentrate to set the milk substrate;
   d) cutting the set milk substrate to form curds and whey;
   e) cooking the curds and whey;
   f) separating the curds and whey; and
   g) forming the flavored cheese from the separated curds;
   wherein the cultured cheese concentrate comprises 1 to about 80 percent of a sulfury-cheddar component, about 10 to about 90 percent of a cheesy component, and about 10 to about 90 percent of a creamy-buttery component; and
   wherein the sulfury-cheddar component is prepared by treating a first dairy product containing an aqueous protein source and fat source combination with lipase and a lactic acid culture at a temperature of about 15 to about 35° C. for about 10 to about 72 hours to obtain a first mixture having a pH of about 5.8 or less; adjusting the pH of the first mixture to about 6 or higher to obtain a second mixture; treating the second mixture with a sulfur-containing substrate, and microorganism that can convert the sulfur-containing substrate to sulfur-containing flavor compounds (e.g., a *Brevibacterium linens* culture or a yeast from the genera *Debaromyces* or *Kluyeromyces*), and optionally a first bacteriocin source, at a temperature of about 15 to about 35° C. for about 12 to about 96 hours to obtain a third mixture; heating the third mixture at a temperature sufficient to inactivate the cultures and enzymes in the third mixture to form the sulfury-cheddar component;

wherein the cheesy component is prepared by treating a second dairy product containing an aqueous protein source and fat source combination with a lipase and a peptidase at a temperature of about 20 to about 45° C. for about 10 to about 24 hours to obtain a fourth mixture; treating the fourth mixture with a lipase, a protease, and an aminopeptidase, and optionally a second bacteriocin source, at a temperature of about 20 to about 50° C. for about 16 to about 96 hours to obtain a fifth mixture; treating the fifth mixture at a temperature sufficient to inactivate the cultures and enzymes in the fifth mixture to form the cheesy component;

wherein the creamy-buttery flavor component is prepared by treating a third dairy product containing an aqueous protein source and fat source combination with a lactic acid culture at a temperature of about 20 to about 35° C. for about 10 to about 24 hours to obtain a sixth mixture having a pH of about 5.4 or less; treating the sixth mixture with a diacetyl-producing flavor culture, and optionally a third bacteriocin source, at a temperature of about 20 to about 35° C. for about 16 to about 240 hours to obtain a seventh mixture; heating the seventh mixture at a temperature sufficient to inactivate the cultures and enzymes in the seventh mixture to form the creamy-buttery component;

wherein at least one of the first, second, and third bacteriocin sources is included.

38. The method of claim 37, wherein the at least one of the first, second, and third bacteriocin sources included each comprise nisin.

39. The method of claim 37, wherein the at least one of the first, second, or third bacteriocin sources included independently are selected from the group consisting of nisin A, nisin Z, pediocin, lactosin, lactacins, carnocin, enterocin, plantaricin, subtilin, epidermin, cinnamycin, duramycin, and ancovenin, individually or in any combination thereof.

40. The method of claim 37, wherein the at least one of first, second, and third bacteriocin sources included comprises a bacteriocin-producing culture.

41. The method of claim 37, wherein the first and second bacteriocin sources are included and independently comprise nisin, wherein nisin is present in a first amount of about 50 to about 500 IU/g in the third mixture, and nisin is present in a second amount of about 50 to about 500 IU/g in the fifth mixture.

42. The method of claim 37, wherein the lactic acid culture used to prepare the sulfury-cheddar flavor component is *Lactococcus lactis* and *Lactococcus lactis* ssp. *cremoris*; and wherein the lipase used to prepare the cheesy flavor component is a fungal lipase, the peptidase used to prepare the cheesy flavor component is *Lactobacillus helveticus*, the protease used to prepare the cheesy flavor component is a neutral bacterial protease, a fungal protease, or mixtures thereof, and the aminopeptidase used to prepare the cheesy flavor component is *Lactobacillus helveticus*.

43. The method of claim 37, wherein the cultured cheese concentrate is a dried powder.

44. The method of claim 37, wherein the first bacteriocin source is included.

45. The method of claim 37, wherein at least one of the first, second, and third bacteriocin sources is used in combination with a secondary antimicrobial agent.

* * * * *

UNITED STATES PATENT AND TRADEMARK OFFICE
CERTIFICATE OF CORRECTION

PATENT NO.        : 7,556,833 B2
APPLICATION NO.   : 10/723257
DATED             : July 7, 2009
INVENTOR(S)       : Dias et al.

Page 1 of 1

It is certified that error appears in the above-identified patent and that said Letters Patent is hereby corrected as shown below:

- On title page, Col. 2 under item [56] (Other Publications), Lines 4-6, delete "Sood, V.K. and Kosikowski, F.V., "Process Cheddar Cheese from Plain and Enzyme Treated Retentates," 1979, J. Dairy Sci. 61:1713-1718.".

- On title page, Col. 2 item [57] (Abstract), Line 10, delete "sulfur-cheddary" and insert -- sulfury-cheddar --.

- In Col. 25, Lines 59-60, Claim 37, delete "Debaromyces or Kluyeromyces)," and insert -- Debaryomyces or Kluyveromyces) --.

Signed and Sealed this

Twentieth Day of October, 2009

David J. Kappos
*Director of the United States Patent and Trademark Office*